United States Patent [19]
Kovaletz

[11] Patent Number: 4,973,361
[45] Date of Patent: Nov. 27, 1990

[54] METHOD AND APPARATUS FOR MANIPULATION OF A LOAD FOR CLEANING TOWER STRUCTURE COMPONENTS

[76] Inventor: Mark P. Kovaletz, 1842 W. Tedmar, Anaheim, Calif. 92804

[21] Appl. No.: 177,589

[22] Filed: Apr. 4, 1988

[51] Int. Cl.[5] .............................................. B08B 9/00
[52] U.S. Cl. ...................................... 134/34; 51/429; 134/42; 239/171; 244/136; 244/137.4
[58] Field of Search ...................... 134/34, 42; 51/429; 244/136, 137.4; 239/171, 172

[56] References Cited

U.S. PATENT DOCUMENTS

| | | | |
|---|---|---|---|
| 2,779,421 | 1/1957 | Rush | 244/136 |
| 3,036,797 | 5/1962 | Agusta | 244/136 |
| 3,044,818 | 7/1962 | Tobey | 244/136 |
| 3,554,468 | 1/1971 | McVicar | 244/137 |
| 4,090,567 | 5/1978 | Tomlinson | 244/136 |
| 4,378,919 | 4/1983 | Smith | 244/136 |
| 4,477,289 | 10/1984 | Kurtgis | 134/34 |

OTHER PUBLICATIONS

Bauer Compressors, Inc. data sheet; Rotapac Power In-Air Out; no date; Norfolk, VA.
California Power Systems data sheet; Rotax 503 Power Plants; no date; San Francisco, CA.
Empire Abrasive Equipment Corp.; Superblast Catalog; no date; pp. 6-15; 18-20; Langhorne, PA.
Forest Service Technology & Development Program; Foam Proportional System; 05/89; USDA—Forest Service, San Dimas, CA.
Forest Service Technology & Development Program; Venturi Foam Proportioning System; 12/89; USDA Forest Service; San Dimas, CA.
Foam Applications for Wildland & Urban Fire Management; vol. 2, No. 1, 1989; pp. 1, 4; National Wildfire Coordinating Group.
Foam Applications for Wildland & Urban Fire Management; vol. 2, No. 3 1989; pp. 1-3; National Wildfire Coordinating Group.
Flow-Mix TM Model 500 Foam Proportioner data sheet; Robwen Inc., Los Angeles, CA; 05/88.
Mallory Compressed Air Foam System data sheet; The Mallory Company, Vancouver, WA; no date.

Primary Examiner—Asok Pal
Attorney, Agent, or Firm—Sheldon & Mak

[57] ABSTRACT

For controllably suspending a load from a helicopter such that the load can be quickly jettisoned in an emergency, a rigid stabilizer bar is suspended from a quick-release cargo hook attachment point of the helicopter, and a yoke structure is releasably carried by the hook in fixed relation to the bar, opposite ends of the yoke having flexible lines connected to spaced apart locations on the load. Opposite ends of the stabilizer bar are connected by bungee cords to landing skid anchors for stabilizing the yoke. The attitude of the load is controlled by yawing and rolling maneuvers of the helicopter. If necessary, the yoke, together with the lines and the load, can be jettisoned from the vehicle by releasing the hook. The load can be configured as a cleaning module for directing a cleaning medium onto an elevated workpiece such as an insulator of a transmission line tower. The cleaning module produces a steam of particulate such as crushed walnut shells in a high-pressure air blast from a nozzle that is located on a boom projecting from the module, the nozzle being aligned in a predetermined direction relative to the yoke. The helicopter can fly with the cleaning module suspended beside the insulator, the nozzle being aimed relative to the workpiece horizontally by yawing the helicopter and vertically by rolling the helicopter, the module having a first position proximate the helicopter, and a second lower position for use with single circuit towers having three horizontally displaced insulators.

14 Claims, 3 Drawing Sheets

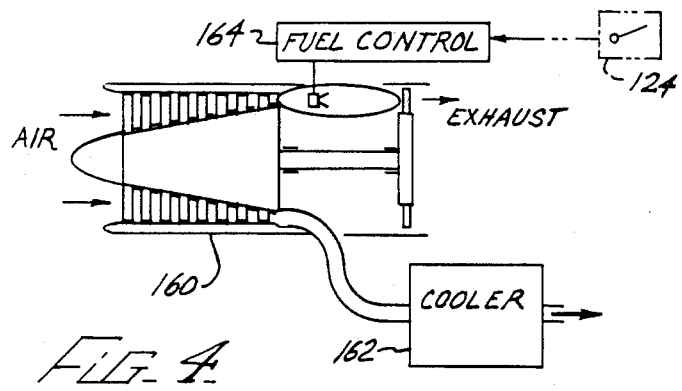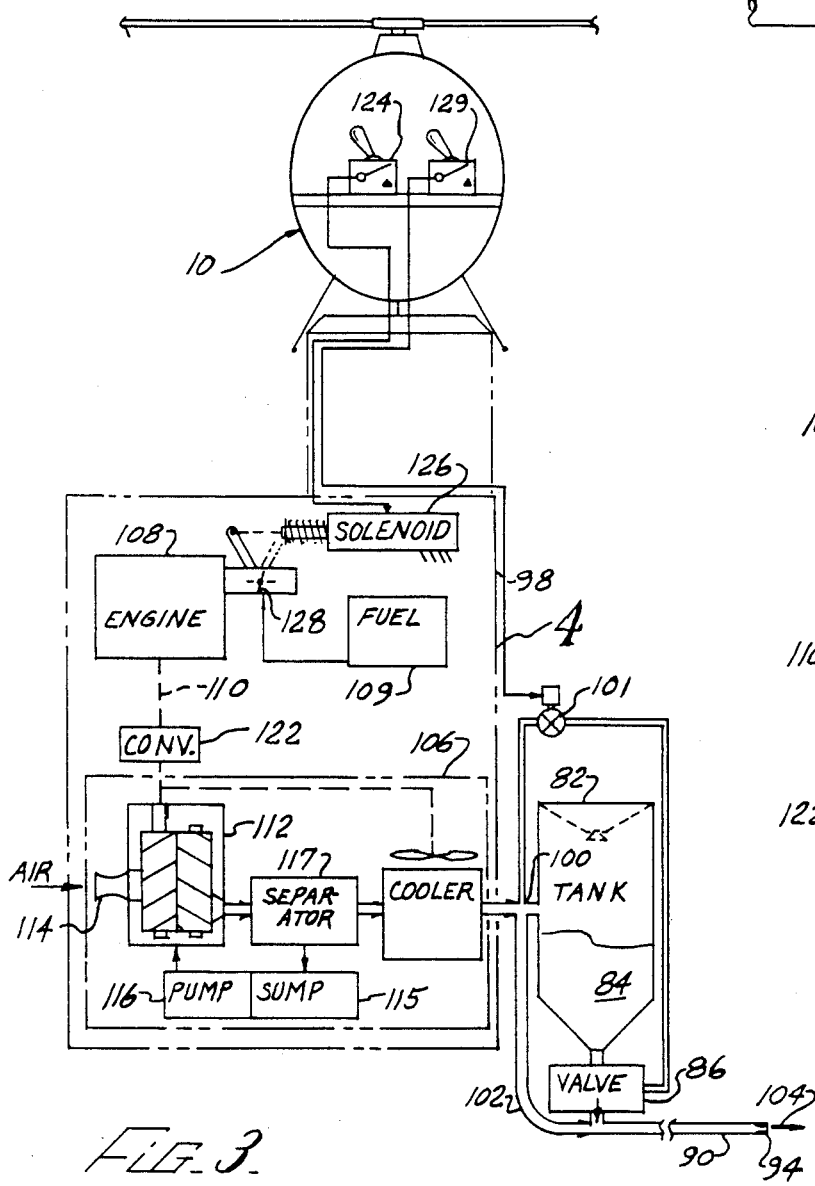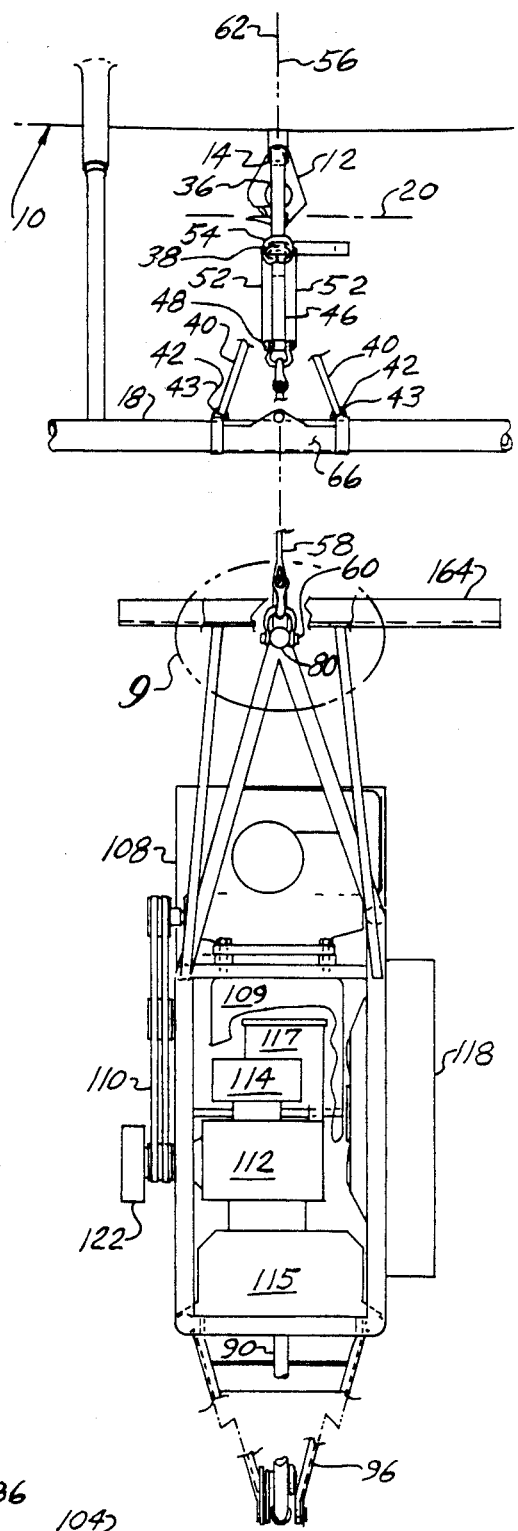

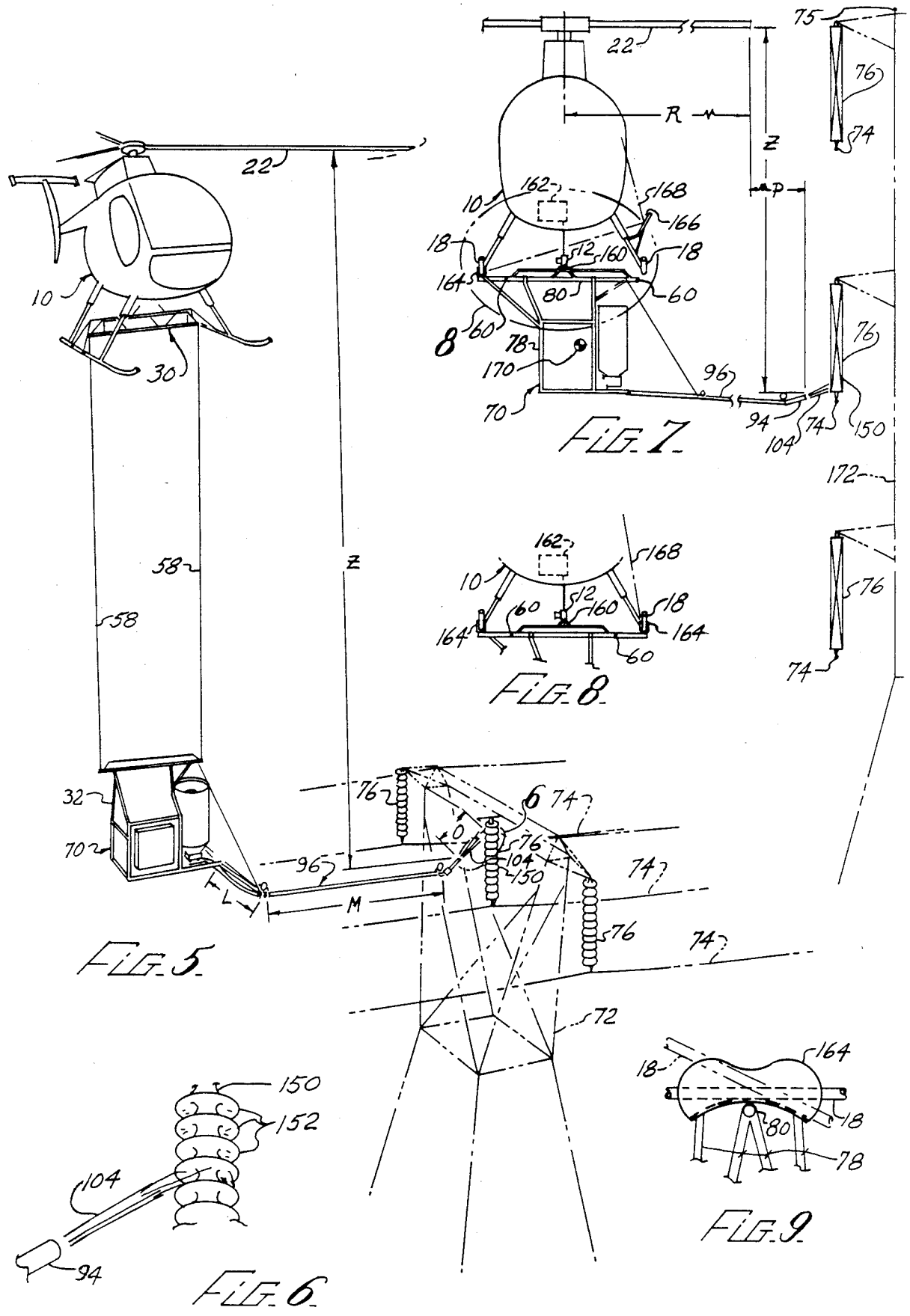

METHOD AND APPARATUS FOR MANIPULATION OF A LOAD FOR CLEANING TOWER STRUCTURE COMPONENTS

BACKGROUND

The present invention relates to maintenance of elevated structures, and more particularly to the controlled manipulation of a load in connection with such maintenance, for cleaning components of the structures.

The manipulation of loads in connection with tower structure construction and maintenance is a key to the viability of such structures. For example, some important structures have been erected at remote and foreboding sites only because it has been possible to fly the components to each site by helicopter, the parts being attached to each structure while the helicopter hovers with the load properly positioned and oriented. See, for example, U.S. Pat. No. 4,378,919 to H. Smith that discloses apparatus by which a load suspended from a helicopter is free to swing beneath the helicopter, yet the rotational position of the load about a vertical axis is controlled by yaw manipulation of the helicopter. The Smith disclosure includes a yoke by which the load is suspended on a pair of cables, the yoke being restrained from rotation under the helicopter by a ring-shaped tubular structure that forms a pair of slots for receiving opposite ends of the yoke. A linkage allows the tubular structure to move back and forth in response to swinging of the cargo hook.

The Smith device is subject to several disadvantages. For example, the linkage is somewhat complex, having several swinging joints. Also, the slot in the tubular structure must provide extra clearance for the yoke to allow for lateral tipping of the tubular structure, reducing the effectiveness of the structure in yaw control. Further, anchor points for the linkage must be provided on the aircraft structure. Moreover, there are times when further control of a suspended load beyond mere rotational control is needed. For example, in one aspect of tower structure maintenance, it is desired to clean critical portions of the structure, such as insulators of power high voltage power transmission towers.

Presently, the insulators are cleaned at relatively long range using deionized water at high pressure. This can be done from the ground using what amounts to a fire truck, and a man carrying a hose can also climb the tower. Attempts to do this from the air have had limited success because water is too heavy for economical transport by helicopter, and a second crew member is required for operating a nozzle turret that is needed for directing the stream sufficiently accurately. This greatly increases the of weight to the load, and the hardware is expensive. The expense of the hardware is aggravated by the need for FAA certification. See, for example, U.S. Pat. No. 4,090,565 to Tomlinson that discloses a fire fighting helicopter, and U.S. Pat. No. 4,477,239 to Kurtgis that discloses a tower insulator cleaning apparatus that is carried by helicopter. Also, when the helicopter is large enough for carrying a meaningful load, two pilots are required under FAA regulations.

Water creates its own problems in that when it is contaminated by dirt from the insulator, it becomes conductive, creating a danger of arcing. Moreover, there are large reactive forces to contend with. "Dry cleaning" has also been done using a blast of air and particles of walnut shells, sand, corn husks or the like. But the air blast has a short range of only two or three feet, tending to preclude effective cleaning from a nozzle mounted on the helicopter, which must fly close to the wires. Also, when hoses are used, such as by a man climbing the tower, the losses are prohibitive.

As mentioned above, a disadvantage of the Kurtgis apparatus is that at least two crew members are required, and only a relatively small quantity of the liquid spray can be carried. Also, the helicopter must fly at a low altitude approximately corresponding to the height of each insulator to be cleaned. This presents the danger that a gust of wind or other emergency might cause the helicopter to crash into the tower and/or the transmission lines, with disastrous consequences. Moreover, the center insulator on a conventional "single circuit" tower is nearly inaccessible from the side, and must be cleaned at long range.

A further disadvantage of the Kurtgis apparatus is that the nozzle is located at the end of a long boom for clearing the ends of the rotor blades. This makes the nozzle particularly difficult to aim accurately. This difficulty is aggravated by the independent control of the position and orientation of the helicopter by its pilot, and the separate aiming of the nozzle in both yaw and elevation by the boom operator. Moreover, the nozzle and/or the boom can get caught in the tower, with the consequent likelihood of crashing the helicopter because neither the boom with its nozzle, nor the remainder of the heavy cleaning apparatus and its operator can be released in an emergency.

Thus there is a need for a highly mobile apparatus with which to manipulate a load, such as in dispensing a cleaning medium, accurately in both yaw and elevation. Also, there is a need for such apparatus that is safe to operate in close proximity to high voltage power transmission lines and towers. There is a further need that such apparatus be adapted for effectively and rapidly cleaning large numbers of tower components, and be inexpensive to build and easy to operate.

SUMMARY

The present invention meets these needs by providing an apparatus and method for controllably suspending a load from a hoverable vehicle such that the load can be quickly jettisoned in an emergency. In one aspect of the invention, the apparatus includes a rigid stabilizer bar that is suspended from a quick-release cargo hook attachment point of the vehicle, a yoke structure releasably carried by the hook, opposite ends of the yoke being adapted for lifting the load by respective load-carrying lines, the yoke structure being removably held in fixed relation to the bar while the yoke structure remains suspended by the hook, and biasing means for yieldably holding the stabilizer bar fixed about a vertical axis and at least one horizontal axis relative to the vehicle. In an emergency the hook can released so that the yoke, together with the lines and the load, may be jettisoned from the vehicle.

The structural members can be located on opposite sides of a longitudinal axis of the vehicle, the horizontal axis of the biasing means preferably corresponding to the longitudinal axis for coupling roll motion of the vehicle to the load. Thus the present invention advantageously utilizes the roll attitude of the vehicle for controlling the attitude of the load about a horizontal axis, the vehicle typically having greater maneuverability in roll than in pitch. A further advantage of the present invention is that the combination of the roll coupling and the suspension of the load below the vehicle creates a pendulum effect that enhances the stability of the vehicle and the load. The structural members can be landing gear components of the vehicle, the apparatus including means for defining an anchor point on those components, the biasing means connecting the bar attachment points to the anchor points. Further, the biasing means can include a pair of extendable members connected between the bar attachment points and the respective anchor points.

Preferably the biasing means produces a greater stiffness about the longitudinal axis than a lateral axis of the vehicle for permitting the vehicle to pitch relative to the load. Preferably the stiffness about the longitudinal axis is at least about ten times that about the lateral axis. More preferably, the stiffness about the longitudinal axis is between about ten and about fifty times that about the lateral axis. For this purpose, the anchor points can be spaced apart horizontally, the bar attachment points being located in a vertical anchor plane that intersects the anchor points. Also, the attachment points can define a bar axis that proximately intersects the attachment member. Further, the bar axis can be located vertically above the anchor points. The extendable members can extend downwardly and laterally outwardly from the attachment points.

Preferably each of the anchor points can include a pair of anchor members that can be spaced apart on opposite sides of the anchor plane for enhancing the stability about the vertical axis, an extendable member being connected to each anchor member. Also, the anchor members can be movable to proximate the anchor plane for facilitating connection of the extendable members. Moreover, the extendable members can include a bungee cord.

Another aspect of the invention provides a method for controllably suspending a load from a hoverable vehicle, the vehicle having a load attachment point, a releasable hook being connected thereto, and a pair of structural members fixably located on opposite sides of the attachment point, the method comprising the steps of:

(a) connecting a rigid stabilizer bar to the attachment point, the stabilizer bar extending on opposite sides of the attachment point to respective first and second bar attachment points;

(b) biasingly connecting the first and second bar attachment points to respectively to the structural members;

(c) connecting a yoke member to the releasable hook, the yoke fixably engaging the stabilizer bar;

(d) connecting a pair of flexible tension members at one end thereof to opposite ends of the yoke member; and (e) connecting opposite ends of the load to respective opposite ends of the tension members.

In a further aspect, the invention provides apparatus for cleaning an elevated workpiece from the hoverable vehicle, the apparatus including means for defining a base, means for attaching the base below the hook member, air compressor means attached to the base, tank means on the base for holding a particulate solid material, the tank means being connected to and pressurized by the air compressor means, nozzle means operatively connected to the tank means for producing a stream of the particulate material in response to air pressure in the tank means, and boom means for locating the nozzle in a predetermined position and orientation with respect to the base, whereby the stream of particulate material can be aimed relative to the workpiece horizontally by yawing the vehicle, and vertically by rotating the vehicle about a horizontal axis. The means for attaching the base below the hook member can include the stabilizer bar, the biasing means for yieldably holding the stabilizer bar, the yoke member, and means for suspending the base from the yoke member. The means for suspending can be tension members connected from opposite ends of the yoke to spaced apart locations on the base. The horizontal axis is preferably a longitudinal axis of the vehicle for vertically adjusting the stream by controlling the roll attitude of the vehicle.

The attachment means can include register means rigidly connected to the base and being adapted for engaging a structural element of the vehicle, and a hook engagement member attached to the base for engagement by the hook. The combination of the hook engagement member and the registration means provides at least a yieldably fixed location of the base relative to the vehicle. The registration means can itself be capable of preventing rotation of the base about a vertical axis relative to the vehicle. For this purpose, the registration means can include an upwardly facing horizontally extending trough member for receiving an elongated cylindrical portion of the vehicle structural member that is offset to one side of the hook and extends parallel to a horizontal axis of the vehicle. Preferably the attachment means is capable of holding the base at least yieldably fixed in a first position proximate the vehicle, and a second position at least about six feet lower than the first position. The first position is particularly advantageous for cleaning dual circuit towers having three vertically spaced insulators on each side; the second position provides convenient access for cleaning the center insulator of a single circuit tower having the insulators spaced horizontally, in which case the vehicle flies above the tower with the module suspended proximate the center transmission line. For this purpose, the attachment means can further include the stabilizer bar, yoke member, biasing means, and means for suspending the base from the yoke member in the second position.

The apparatus can further include means for controlling the air pressure in the tank for controlling the rate of particulate material in the nozzle means.

The present invention, moreover, includes a method for cleaning a workpiece, the workpiece being located at an elevation above ground level as a tower structure component, the method comprising:

(a) suspending a cleaning module from an airborne hoverable vehicle, the module comprising:
(i) means for defining a base;
(ii) air compressor means attached to the base means;
(iii) tank means for holding a particulate solid material, the tank being connected to and pressurized by the air compressor means;
(iv) nozzle means connected to the tank means whereby a stream of the particulate material is produced therefrom in response to air pressure in the tank means;
(v) boom means for locating the nozzle in a predetermined position and orientation with respect to the base means;

(b) maneuvering the vehicle for positioning the module proximate the tower structure with the nozzle having a positional elevation proximate the elevation of the workpiece;

(c) yawing the vehicle for directing the stream laterally onto the work piece; and (d) rotating the vehicle about a horizontal axis for adjusting the stream vertically on the workpiece.

The step of rotating the vehicle about the horizontal axis can include rolling the vehicle about a longitudinal axis. Also, the method can include the further step of controlling the air pressure in the tank means for controlling the rate of particulate flow through the nozzle means. For this purpose, the method can include the further step of controlling a source of power for the air compressor. The power can be controlled between a first high level for producing the stream and a second low level for preventing the stream. Moreover, the apparatus can further include a control valve between the tank means and the nozzle means, the method further comprising the step of operating the control valve for preventing the flow of the particulate material.

DRAWINGS

These and other features, aspects, and advantages of the present invention will become better understood with reference to the following description, appended claims, and accompanying drawings where:

FIG. 2 is a side fragmentary sectional elevational view of the apparatus of FIG. 1;

FIG. 3 is a functional schematic diagram of the apparatus of FIG. 1;

FIG. 4 is a functional schematic diagram of an alternative configuration of the apparatus of FIG. 1 within region 4 of FIG. 3;

FIG. 5 is a front oblique elevational perspective view of the apparatus of FIG. 1 in use cleaning a first elevated workpiece;

FIG. 6 is an elevational perspective detail view of the apparatus of FIG. 1 within region 6 of FIG. 5;

FIG. 7 is a fragmentary front elevational view of the apparatus of FIG. 1 in an alternative configuration in use cleaning a second elevated workpiece;

FIG. 8 is a fragmentary front elevational view showing an alternative configuration of the apparatus of FIG. 1 within region 8 of FIG. 7; and FIG. 9 is a fragmentary detail elevational view of the apparatus of FIG. 1 within region 9 of FIG. 2.

DESCRIPTION

Figure 1:
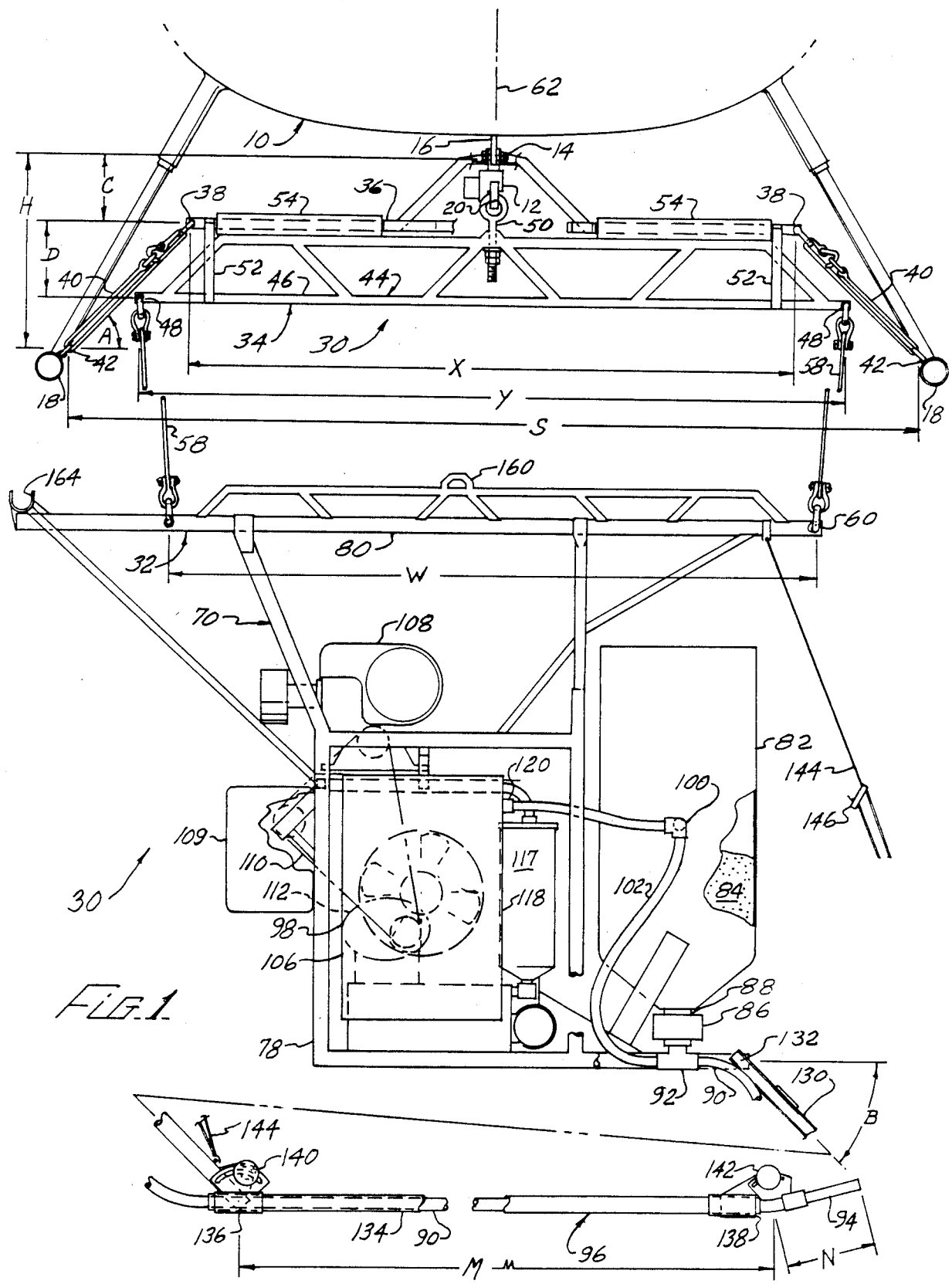
FIG. 1 is a front fragmentary sectional elevational view of a helicopter equipped with apparatus according to the present invention.

The present invention is directed to an apparatus and method for controllably positioning a load from a hoverable vehicle, and further to the application of the load in the form of a particulate medium to an elevated workpiece for the purpose of cleaning same. With reference to the drawings, particularly FIGS. 1-3 and 5, a helicopter or other hoverable vehicle 10 is equipped with a releasable cargo hook 12, the hook 12 being connected by an attachment bolt 14 to a cable 16, the cable 16 being attached to the vehicle 10 for suspending the hook 12 underneath the vehicle 10. The vehicle 10 is also equipped with landing gear structure in the form of a pair of skids 18, the skids 18 being located on opposite sides of a longitudinal axis 20 of the vehicle 10, the longitudinal axis 20 intersecting the hook 12. As shown in FIG. 1, the skids 18 are spaced apart by a distance S, the attachment bolt 14 being located midway therebetween and elevated therefrom vertically by a distance H.

According to the present invention, an apparatus 30 for manipulation of a load 32 includes a stabilizer unit 34 that is suspended from the hook 12 and the attachment bolt 14 as described herein. The stabilizer unit 34 includes a stabilizer bar 36 that extends horizontally on opposite sides of the hook 12 to respective bar attachment points 38, the bar attachment points 38 being spaced apart by a distance X and displaced below the attachment bolt 14 by a vertical distance C. Each of the bar attachment points 38 is biasingly connected to a respective skid 18 of the vehicle 10 by a corresponding bungee means 40, the connection of each bungee means 40 to the skid 18 defining an anchor point 42, the anchor point 42 being fixed relative to the respective skid 18. A yoke assembly 44 is suspended from the hook 12, the yoke assembly 44 including a yoke truss 46 that extends on opposite sides of the hook 12 to a pair of yoke attachment points 48, the yoke truss 46 being releasably connected to the hook 12 by an eye bolt 50, the yoke attachment points 48 being spaced apart by a horizontal distance Y and located a vertical distance D below the bar attachment points 38.

The yoke assembly 44 is held in a fixed position relative to the stabilizer bar 36 by means of spaced apart pairs of leg members 52, each pair of the leg members 52 fixably depending from the stabilizer bar 36 from proximate a respective bar attachment point 38, the leg members 52 slidably engaging opposite sides of the yoke truss 46. A pair of cushion members 54 enclose the stabilizer bar 36, each of the cushion members 54 being located proximate a pair of the leg members 52 for bearing against the top of the yoke truss 46 when the eye bolt 50 engages the hook 12. A desired degree of pressure can be maintained between the cushion members 54 and the top of the yoke truss 46 by appropriately adjusting the eye bolt 50. The attachment bolt 14, the eye bolt 50, the bar attachment points 38, and the yoke attachment points 48 each lie in a common anchor plane, designated stabilizer plane 56 in FIG. 2. The stabilizer plane 56 is nominally a vertical plane that is normal to the longitudinal axis 20 of the vehicle 10, the bungee means 40 and the anchor points 42 also being nominally located in the stabilizer plane 56.

The load 32 is suspended from the yoke assembly 44 by a pair of flexible tension members 58, each tension member 58 being connected between one of the yoke attachment points 48 and a respective load attachment point 60 of the load 32, the load attachment points 60 being spaced apart horizontally by a load attachment distance W, the distance W being approximately equal to the yoke attachment distance Y between the yoke attachment points 48. The distance Y is less than the distance S, and the distance C plus the distance D is less than the distance H for locating the stabilizer unit 34 above ground level when the vehicle 10 is at rest, and for permitting the tension member 58 to pass between the skids 18. Suitable tensioning of the bungee means 40 provides a high degree of yaw stiffness of the stabilizer unit 34 about a vertical axis 62 of the vehicle 10, the vertical axis 62 intersecting the attachment bolt 14 and, nominally, the eye bolt 50. The distance X is preferably from about 50% to about 90% of the distance S between the skids 18 for enhancing the yaw stiffness. More preferably, the distance X is between approximately 65% and approximately 75% of the distance S. Also, the distance C by which the bar attachment points 38 are displaced below the bolt 14 assures that when the stabilizer unit 34 is unloaded, the stabilizer unit 34 is effectively prevented from flopping around, the stabilizer plane 56 remaining approximately vertical. On the other hand, the distance C is made relatively small compared with the vertical distance H by which the bolt 14 is located above the skid 18 for limiting bending stresses on the stabilizer unit 34 in a horizontal direction when the vehicle 10 rotates in pitch relative to the load 32. Accordingly, the distance C is made from about 20% to about 40% of the distance H, being more preferably about 30% of the distance H. Also, an angle A is formed in the stabilizer plane 56 between each bungee means 40 and the anchor points 42, the angle A being approximately 45°.

As shown in FIG. 2, each of the anchor points 42 has two counterparts, designated anchor band 43, that are spaced apart on opposite sides of the stabilizer plane 56, each being formed as a band member that encloses the skid 18, and connecting a respective bungee means 40. Removable spacer means 66 are interposed between the bands 43 on each skid 18. This arrangement advantageously permits the bungee means 40 to be connected at reduced tension for ease of installation, and enhances the yaw stability of the stabilizer unit 34 for a given roll stiffness thereof.

The combination of the roll coupling between the load 32 and the vehicle 10 with the location of the load beneath the vehicle advantageously enhances the stability of both the vehicle and the load. This is because the combined mass of the load and the vehicle is centered further below the center of thrust than is the case when the load is within the vehicle.

An important aspect of the present invention is that the load 32 can be a cleaning module 70, the cleaning module 70 being particularly useful in the maintenance of transmission line towers such as the tower 72 shown in FIG. 5. The tower 72 serves to support a plurality of transmission lines 74, each by a respective insulator or workpiece 76, the workpiece 76 requiring periodic cleaning maintenance for removing accumulations of foreign material that would otherwise eventually produce harmful arcing between the lines 74 and the tower 72. In FIG. 5, the tower 72 supports three of the transmission lines 74 in a typical "single circuit" three-phase configuration, the respective workpieces 76 being horizontally disposed. Also, a pair of grounded sky lines 75 are supported from the top of the tower 72 for preventing circuit damage from lightning.

The cleaning module 70 includes a frame or base 78 having an overhead load beam 80, the load beam 80 incorporating the load attachment points 60. With further reference to FIG. 3, a tank 82 is mounted on the base 78 for carrying the cleaning medium in the form of a particulate solid material 84, a control valve 86 being connected to a bottom outlet 88 of the tank 82 for dispensing the material 84 through a delivery line 90. The delivery line 90 is connected to the control valve 86 by a Tee fitting 92, and also to a nozzle 94, the nozzle 94 being mounted in a predetermined position and orientation with respect to the base 78 on a boom assembly 96. An air compressor means 98 is connected to the tank 82 by a tank fitting 100, a manifold line 102 also connecting the tank fitting 100 to the Tee fitting 92. Thus the compressor means 98 simultaneously pressurizes the tank 82 while delivering a large quantity of air at the same pressure to the delivery line 90. The tank fitting 100 is also operatively connected through a solenoid valve 101 to the control valve 86 for automatically opening the control valve 86 when the pressure at the tank fitting 100 reaches a predetermined level. Thus whenever the pressure at the tank fitting 100 is at or above the predetermined level, the material 84 is allowed to pass through the control valve 86 at a predetermined rate for mixing with the air in the delivery line 90 as long as the solenoid valve is also activated, the material 84 being ejected from the nozzle 94 with the air in a high-velocity stream 104.

In an exemplary configuration of the air compressor means 98, a screw compressor unit 106 is operatively connected to a gasoline reciprocating engine 108 by drive belt means 110, the engine 108 being fed by a fuel supply 109. The compressor unit 106 includes a quasi-positive displacement twin-screw pump 112 having an air inlet 114, an oil circulation system having a sump 115 and pump means 116, an air/oil separator 117, a fan cooler 118, and an outlet 120, the outlet 120 being connected to the tank fitting 100. A compressor unit suitable for use as the compressor unit 106 in the present invention is available as Roto Model 2A, Roto being a trademark of Bauer Compressors Inc., of Norfolk, Va. The Roto 2A compressor is capable of delivering over 120 cfm of air at 100 psi compressor discharge pressure when driven with a power input of 30 horsepower. The compressor operates with essentially positive displacement between 4000 rpm and a service maximum about 6000 rpm, there being no effective seal below 3000 rpm such that a negligible amount of power is required under idling conditions. The air flow rate ranges from about 75 cfm at 4500 rpm up to about 130 cfm at the maximum of 6000 rpm.

An engine suitable for use as the engine 108 in the present invention is available as Rotax Model 503 from California Power Systems of San Jose, Calif. In a single carburetor version, this engine is capable of delivering approximately 25 horsepower at 4000 rpm, 30 horsepower at 4500 rpm, 35 horsepower at 5000 rpm, 40 horsepower at 5500 rpm, and 44 horsepower at 6000 rpm. This engine, which weighs approximately 70 pounds, requires approximately 2.5 gallons per hour of fuel when producing 30 horsepower.

A torque converter unit 122 is connected between the compressor unit 106 and the drive belt means 110 for enhancing the ability of the engine 108 to deliver needed power to the pump 112 over a wide range of operating conditions. Alternatively, the drive belt means 110 produces a 1:1 drive ratio such that the speed of the engine 108 is the same as that of the pump 112. In fact, the engine 108 could be directly coupled to the pump 112, except that one of the engine 108 and pump 112 would be required to be configured for running in an opposite direction to that of the readily available models of these components noted above.

As further shown in FIG. 3, the cleaning module 70 is controlled by an air control switch 124 which is located within the vehicle 10, the switch 124 being operatively connected to a solenoid actuator 126 for controlling a throttle member 128 of the engine 108. When the solenoid actuator 126 is activated by the air control switch 124, the throttle member 128 is moved to an adjustable substantially open position for producing a predetermined high power output from the engine 108. When the solenoid actuator 126 is deactivated, the throttle member 128 moves to an idle position for operating the engine 108 in an idling condition, the idling condition being at a speed substantially below 3000 rpm, such as 1000 rpm. A media switch 129 for controlling the solenoid valve 101 is also located within the vehicle 10. Accordingly, when the solenoid actuator 126 is de-energized, there is substantially no flow of either air or the material 84 from the nozzle 94, the control valve 86 being closed in response to low air pressure at the tank fitting 100. When the solenoid actuator 126 is activated, high air pressure is obtained at the tank fitting 100, but the control valve 86 remains closed until the solenoid valve 101 is activated by the media switch 129, at which time the control valve 86 is opened and operational quantities of the material 84 are driven through the nozzle 94 with the air for producing the stream 104.

A nozzle suitable for use as the nozzle 94 is available as Super Blast model DCV-4 from Empire Abrasive Equipment Corp. of Langhorne, Pa. The DCV-4 nozzle includes a centered carbide venthri having a 0.25 inch ID, and is rated an air flow rate of 81 CFM and 494 pounds of sand flow per hour at a nozzle pressure of 100 psi, 18 horsepower being required. Other components appropriate for use as the tank 82, the control valve 86, the delivery line 90, the Tee fitting 92, and the tank fitting 100, and the manifold line 102, are similarly available from Empire Abrasive Equipment Corporation.

The boom assembly 96 includes an A-frame member 130, opposite legs thereof being pivotably joined by a pair of frame joints 132 to the base 78, an arm member 134 being pivotably connected to the apex of the A-frame member 130 by an arm joint 136. The nozzle 94 is pivotably mounted to the arm member 134 remotely from the arm joint 136 by a nozzle joint 138. Arm member 134 is fabricated from an electrically non-conductive material for isolating the nozzle 94 from the A-frame member 130 and the base 78 of the cleaning module 70. Similarly, the delivery line 90 comprises an electrically non-conductive material such as rubber. As shown in the drawings, the arm member 134 is fabricated from a tube of fiberglass, the delivery line 90 being supportively located therein. The boom assembly 96 can extend from the base 78 a distance L between frame joint 132 and the arm joint 136, plus a distance M between the arm joint 136 and the nozzle joint 138, plus a distance N between the nozzle joint 138 and the end of the nozzle 92. The distance L can be about 7 feet, the distance M can be from about 3 feet to about 7 feet, and the distance N can be about 8 inches. Thus the maximum distance between the frame joint 132 and the end of the nozzle 92 is from about 11 feet to about 15 feet. The arm joint 136 and the nozzle joint 138 are fixably adjustable to predetermined relative orientations. For this purpose, the arm joint 136 is provided with an adjustable arm joint clamp 140, and an adjustable nozzle joint clamp 142. A flexible arm tension member 144 is connected to the boom assembly 96 proximate the arm joint 136 and anchored to the base 78 proximate the load beam 80, the tension member 144 being equipped with adjustment means 146 for adjustably defining an angle B of the A-frame member 130 relative to the base 78, except that the tension member 144 permits the A-frame member 130 to be pivoted upwardly about the frame joint 132 to proximately a horizontal position when the cleaning module 70 is at rest on the ground. Typically the tension member 144 is adjusted for maintaining the angle B between about 45° and about 60° for enhancing a vertical distance Z between the nozzle 92 and a rotor 22 of the vehicle 10, and for permitting the boom assembly 96 to clear obstructions associated with the tower 72.

In operation, the air switch 124 and the media switch 129 are both switched off until the vehicle 10, together with the cleaning module 70, approaches a tower 72 at which cleaning is to be done. Preferably, the air switch 124 is next turned on, activating the solenoid 126 for producing the high-pressure output of the compressor means 98 as described above. As the vehicle 10 is further maneuvered for bringing the nozzle 94 proximate the workpiece 76, the solenoid valve 101 is then activated by the media switch 129 for producing the stream 104 as also described above. Normally, the solenoid 126 is energized continuously while a full complement of the workpieces 76 of the tower 72 are cleaned. When it is desired to interrupt the stream 104 such as when moving between the workpieces 76, the media switch 129 is operated for de-energizing the solenoid valve 101. This is because the control valve 86 responds relatively rapidly to operation of the solenoid valve 101 as compared with operation of the solenoid 126, because of the time required for the engine 108 to change speeds, and for a corresponding change of air pressure in the tank 82. When the last workpiece 76 of the tower 72 has been cleaned, the solenoid 126 is deactivated by operation of the air switch 124, with a consequent savings of fuel expended from the fuel supply 109 during transit to the next tower 72.

An experimental prototype of the cleaning module 70 as described above, but without the arm joint 136, has been built and tested, the module 70 having a weight of approximately 550 pounds, the tank 82 being capable carrying approximately 150 pounds of the material 84. The tests show that prototype is operable to produce the stream 104 continuously for about 45 minutes. It is expected that by substituting slightly larger counterparts of the tank 82 and the fuel supply 109, along with a modest weight-reduction of the module 70, continuous operation for one hour or more will be possible.

It has been determined that the cleaning module 70 is effective in cleaning the workpiece 76 with the nozzle 94 positioned at an operating distance 0 from the workpiece, the distance 0 being up to about 6 feet. Typically the workpiece 76 is an elongated cylindrical insulator 150 having a spaced plurality of ring portions 152, as shown in FIG. 6. It has unexpectedly been discovered that by directing the stream 104 upwardly and laterally against the ring portions 152, the material 84 is deflected by the ring portions 152 such that substantially all of the insulator 150 can be cleaned while the nozzle 94 is positioned to one side only of the insulator 150, as shown in FIG. 6.

With further reference to FIG. 4, an alternative configuration of the compressor means 98 includes a gas turbine compressor 160 and a cooler module 162, the compressor 160 being provided with a fuel control 164 that is responsive to the control switch 124. In this configuration, the cleaning module is capable of carrying a much larger payload because the weight efficiency of the compressor 160 is greatly improved over that of the compressor unit 106 and the separate engine 108.

In another important aspect of the present invention, the cleaning module 70 can be releasably carried proximate the vehicle 10 as an alternative to the vertically separated configuration that is shown in FIG. 5. As shown in FIGS. 1 and 2, and with further reference to FIG. 7, the load beam 80 of the base 78 is equipped with a hook catch 160 for engagement by the releasable hook 12, the hook 12 also being capable of closing and latching about the catch 160. The vehicle 10 is also equipped with a winch means 162 for vertically positioning the hook 12 as desired by the operator. An upwardly facing trough member 164 is rigidly attached to the load beam 80 for engaging one of the skids 18 of the vehicle 10. Thus with the stabilizer unit 34 removed, the vehicle 10 can be made to hover above the cleaning module 70, the skid 18 being guided into engagement with the trough member 164; and the hook 12, initially in its released condition, is engaged with the hook catch 160. As shown in FIG. 7, a mirror 166 is provided on the vehicle 10 for establishing a line of sight 168 between the operator and the trough member 164, the trough member 164 being located on an opposite side of the vehicle 10 from the operator. This is because the hook catch 160 is located laterally slightly to one side of a center of gravity 170 of the cleaning module 70 for producing an upward force reaction at the trough member 164 that maintains the engagement with the skid 18. It is preferred that the trough member 164 be located opposite the boom assembly 96 because the lateral offset of the hook catch 160 results in an increased extension of the boom assembly 96 beyond the rotor 22 of the vehicle 10, the boom assembly 96 being located on the same side of the vehicle 10 as the operator for facilitating effective aiming of the nozzle 94.

In this alternative configuration, the cleaning module 70 is essentially rigidly coupled proximate the vehicle 10, the vertical distance Z between the nozzle 94 and the rotor 22 being substantially reduced by at least about six feet compared with the previously described configuration shown in FIG. 5. This alternative configuration is well suited for cleaning the insulators 150 of a "dual circuit" three phase transmission tower 172 as schematically depicted in FIG. 7. As further shown in FIG. 7, the nozzle 94 protrudes a distance P laterally beyond the rotor 22 of the vehicle 10. Typically, the rotor 22 can have a radius R of approximately 13.2 feet. In an exemplary configuration of the present invention, the distance P is preferably between about 7 feet and 8 feet.

With further reference to FIG. 8, another alternative configuration is provided by having two of the trough members 164 at opposite ends of the load beam 80, each of the trough members 164 engaging a respective skid 18. In this configuration, the hook catch 160 is centrally located between the load attachment points 60, and between the trough members 164. The mirror 166 is not required in this configuration because the line of sight 168 can be between the operator and the trough member 164 on the same side of the vehicle 10. Suitable precautions, however, must be taken to prevent the winch means 162 from raising the hook 12 above a level required for the engagement of the trough members 164 with the skid 18. Otherwise, the load beam 80 would be subject to bending by excessive upward movement of the hook 12. Suitable protection can be provided by a conventional limit stop means (not shown) that is operatively connected to the winch means 162. With further reference to FIG. 9, a curve-shaped alternative configuration of the trough member 164 permits a rocking motion between the trough member 164 and the skid 18 for allowing the vehicle 10 to pitch relative to the cleaning module 70.

Although the present invention has been described in considerable detail with reference to certain preferred versions thereof, other versions are possible. For example, the tank 82 can have a spherical shape, being fabricated of a high-strength fibrous material such as carbon filament for providing improved payload capacity of the cleaning module 70 at a given gross weight thereof. Also, the air switch 124 and/or the media switch 129 can be operatively coupled to the cleaning module 70 by a radio link. Therefore, the spirit and scope of the appended claims should not necessarily be limited to the description of the preferred versions thereof.

What is claimed is:

1. Apparatus for cleaning a workpiece from a hoverable vehicle, the vehicle having a load attachment point, a releasable hook being connected thereto, a pair of structural members fixably located on opposite sides of the attachment point, the workpiece being located at an elevation above ground level as a tower structure component, the apparatus comprising:
   (a) base means for defining a base;
   (b) attachment means for releasably suspending the base means from the hook, the attachment means being capable of holding the base means approximately fixed relative to the vehicle about a vertical axis and at least one horizontal axis of the vehicle;
   (c) air compressor means attached to the base means;
   (d) tank means for holding a particulate solid material, the tank means being connected to and pressurized by the air compressor means;
   (e) nozzle means connected to the tank means whereby a stream of the particulate material is produced therefrom in response to air pressure in the tank means; and
   (f) boom means for locating the nozzle in a predetermined position and orientation with respect to the base means.

2. The apparatus of claim 1 wherein the attachment means comprises:
   (a) a rigid stabilizer bar having an attachment member for attachment to the attachment point and extending on opposite sides of the attachment point to respective first and second bar attachment points;
   (b) a yoke member having a hook attachment member for attachment to the releasable hook, the yoke member fixably engaging the stabilizer bar when the hook attachment member is attached to the hook;
   (c) biasing means for yieldably holding the stabilizer bar fixed about the vertical axis and at least one horizontal axis of the vehicle; and
   (d) means for suspending the base means from the yoke member.

3. The apparatus of claim 2 wherein the means for suspending the base means from the yoke member comprises a pair of tension members, the tension members being connected from opposite ends of the yoke member to spaced apart locations on the base means.

4. The apparatus of claim 1 wherein the attachment means comprises:
   (a) registration means rigidly connected to the base means, the registration means being adapted for engaging a structural element of the vehicle; and
   (b) a hook engagement member attached to the base means for engagement by the hook, whereby the combination of the hook engagement member and the registration means is capable of holding the base means at least yieldably fixed relative to the vehicle.

5. The apparatus of claim 4 wherein the registration means is capable of preventing rotation of the base means about a vertical axis relative to the vehicle.

6. The apparatus of claim 5 wherein the structural member of the vehicle includes an elongated cylindrical portion, the cylindrical portion being offset to one side of the hook and extending parallel to a horizontal axis of the vehicle, the registration means comprising an upwardly facing horizontally extending trough member for receiving the cylindrical portion of the structural member.

7. The apparatus of claim 4 wherein the attachment means is capable of holding the base means at least yieldably fixed in a first position proximate the vehicle, and a second position, the second position being at least about six feet lower than the first position.

8. The apparatus of claim 7 wherein the attachment means further comprises:
   (a) a rigid stabilizer bar having an attachment member for attachment to the attachment point and extending on opposite sides of the attachment point to respective first and second bar attachment points;
   (b) a yoke member having a hook attachment member for attachment to the releasable hook, the yoke member fixably engaging the stabilizer bar when the hook attachment member is attached to the hook;
   (c) biasing means for yieldably holding the stabilizer bar fixed about the vertical axis and at least one horizontal axis of the vehicle; and
   (d) means for suspending the base means from the yoke member, the base means being located in the second position.

9. A method for cleaning a workpiece, the workpiece being located at an elevation above ground level as a tower structure component, the method comprising:
   (a) releasably suspending a cleaning module from an airborne hoverable vehicle, the module comprising:
      (i) means for defining a base;
      (ii) air compressor means attached to the base means;
      (iii) tank means for holding a particulate solid material, the tank being connected to and pressurized by the air compressor means;
      (iv) nozzle means connected to the tank means whereby a stream of the particulate material is produced therefrom in response to air pressure in the tank means;
      (v) boom means for locating the nozzle in a predetermined position and orientation with respect to the base means;
   (b) maneuvering the vehicle for positioning the module proximate the tower structure with the nozzle having a positional elevation proximate the elevation of the workpiece;
   (c) yawing the vehicle for directing the stream laterally onto the work piece; and
   (d) rotating the vehicle about a horizontal axis for adjusting the stream vertically on the workpiece.

10. The method of claim 9 wherein the step of rotating the vehicle about the horizontal axis comprises the step of rolling the vehicle about a longitudinal axis.

11. The method of claim 9 further comprising the step of controlling the air pressure in the tank means for controlling the rate of flow of the particulate material through the nozzle means.

12. The method of claim 9 wherein the step of controlling the air pressure comprises the step of controlling a source of power for the air compressor.

13. The method of claim 9 wherein the step of controlling the power comprises the steps of selectively powering the air compressor means at a first high level, for producing the stream; and powering the air compressor means at a second low power level for preventing the stream.

14. The method of claim 9 wherein the apparatus further comprises a control valve between the tank means and the nozzle means, the method further comprising the step of operating the control valve for selectively preventing the flow of the particulate material through the nozzle means.

* * * * *